United States Patent
Sandon et al.

(10) Patent No.: US 9,189,380 B2
(45) Date of Patent: Nov. 17, 2015

(54) SYSTEMS AND METHODS TO SAVE AND RESTORE A WRITE GATHER PIPE

(71) Applicant: INTERNATIONAL BUSINESS MACHINES CORPORATION, Armonk, NY (US)

(72) Inventors: Peter A. Sandon, Essex Junction, VT (US); Milan Shah, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 225 days.

(21) Appl. No.: 13/905,399

(22) Filed: May 30, 2013

(65) Prior Publication Data
US 2014/0359234 A1    Dec. 4, 2014

(51) Int. Cl.
*G06F 12/00*    (2006.01)

(52) U.S. Cl.
CPC ...................................... *G06F 12/00* (2013.01)

(58) Field of Classification Search
None
See application file for complete search history.

(56) References Cited

U.S. PATENT DOCUMENTS

| 6,694,417 | B1 | 2/2004 | Liao et al. | |
|---|---|---|---|---|
| 7,356,506 | B2* | 4/2008 | Watson et al. | 705/39 |
| 2014/0143500 | A1* | 5/2014 | Moyer et al. | 711/133 |

OTHER PUBLICATIONS

"Finite-state machine" http://en.wikipedia.org/wiki/Finite-state_machine as archived by www.archive.org on Apr. 6, 2012.*

* cited by examiner

*Primary Examiner* — Daniel Tsui
(74) *Attorney, Agent, or Firm* — Andrew M. Calderon; Roberts Mlotkowski Safran & Cole, P.C.

(57) ABSTRACT

Systems and methods for efficient data transfer in a data processing system that includes saving and restoring residual data of a write gather facility. Specifically, a method is provided for data processing that includes writing an address to a register. The method further includes initiating a save operation of residual data within the write gather facility. The writing of the address to the register causes the initiation of the save operation. The residual data is one byte to any number of bytes less than a predetermined number of bytes gathered in the write gather facility.

20 Claims, 3 Drawing Sheets

SYSTEMS AND METHODS TO SAVE AND RESTORE A WRITE GATHER PIPE

FIELD OF THE INVENTION

The invention relates to systems and methods for data processing and, more particularly, to systems and methods for efficient data transfer in a data processing system that includes saving and restoring residual content of a write gather pipe.

BACKGROUND

It has been recognized in the art that the overall performance of conventional data processing systems depends not only upon the individual performance of the constituent components of the data processing system, but also upon the efficiency of data transfer between the components. For example, in a conventional data processing system including a processor and a memory system, many strategies have been proposed and implemented in order to improve the efficiency of data transfer between the processor and the memory system. One such strategy is referred to as store gathering.

Store gathering typically refers to a strategy of data transfer from the processor to the memory system in which the processor is equipped with a write-gather or store-gather facility that collects data associated with a number of smaller (e.g., two byte) store operations associated with multiple memory addresses in a defined address range and then outputs all of the collected data in a single larger (e.g., eight byte) store operation. More specifically, the write-gather or store-gather facility collects together multiple individual store operands so as to efficiently transfer the store operands to memory as a group. One particular such facility is a write gather pipe, which is designed for efficient transfer of noncacheable data from the processor to the external memory.

One implementation of a write gather pipe may comprise a 128-byte circular first-in, first-out (FIFO) buffer (WPB) and a special purpose register, a Write Pipe Address Register (WPAR). For a non-cacheable store instruction to the address specified in WPAR, the operand is stored sequentially in the buffer. When there are at least 32 bytes of data in the buffer, the write gather pipe executes a 32 byte burst transfer of data to the external memory. At any given time, the WPB holds from 0 to 31 bytes of data that cannot yet be written to memory. When a thread that is using the write gather pipe is interrupted, that data must be preserved so that the thread can resume from its interrupted state when control returns to it. This can be done conventionally, for example, by allowing only one thread to reserve the write gather pipe at any given time, so that the state of the WGB is maintained for that one thread across interruptions. However, since the conventional write gather pipe is configured to maintain the state of the WPB across interruptions of a thread, the facility cannot be time shared among threads.

Accordingly, there exists a need in the art to overcome the deficiencies and limitations described hereinabove.

SUMMARY

In a first aspect of the invention, a method is provided for data processing that includes writing an address to a register. The method further includes initiating a save operation of residual data within the write gather facility. The writing of the address to the register causes the initiation of the save operation. The residual data is one byte to any number of bytes less than a predetermined number of bytes gathered in the write gather facility.

In another aspect of the invention, a method is provided for data processing that includes writing an address to a register upon interruption of a thread that is gathering data in a write gather facility. The method further includes initiating a save operation of residual data within the write gather facility, wherein the residual data is one byte to any number of bytes less than a predetermined number of bytes gathered in the write gather facility. The method further includes transferring the residual data including the byte count to a memory at the address written to the register. The writing of the address to the register causes the initiating the save operation and the transfer of the residual data.

In yet another aspect of the invention, a computing system is provided for that includes at least one register configured to allow a save address to be specified. The computing system further includes a processor configured to write the save address to the register. The computing system further includes a write gather facility configured to gather data and initiate a burst transaction to write the data in a memory. The computing system further includes at least one finite state machine configured to initiate a save operation of residual data within the write gather facility. The writing of the save address to the at least one register triggers the at least one finite state machine to initiate the save operation. The residual data is one byte to any number of bytes less than a predetermined number of bytes gathered in the write gather facility, which causes the write gather facility to initiate the burst transaction to write the data in the memory.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

Figure 1:
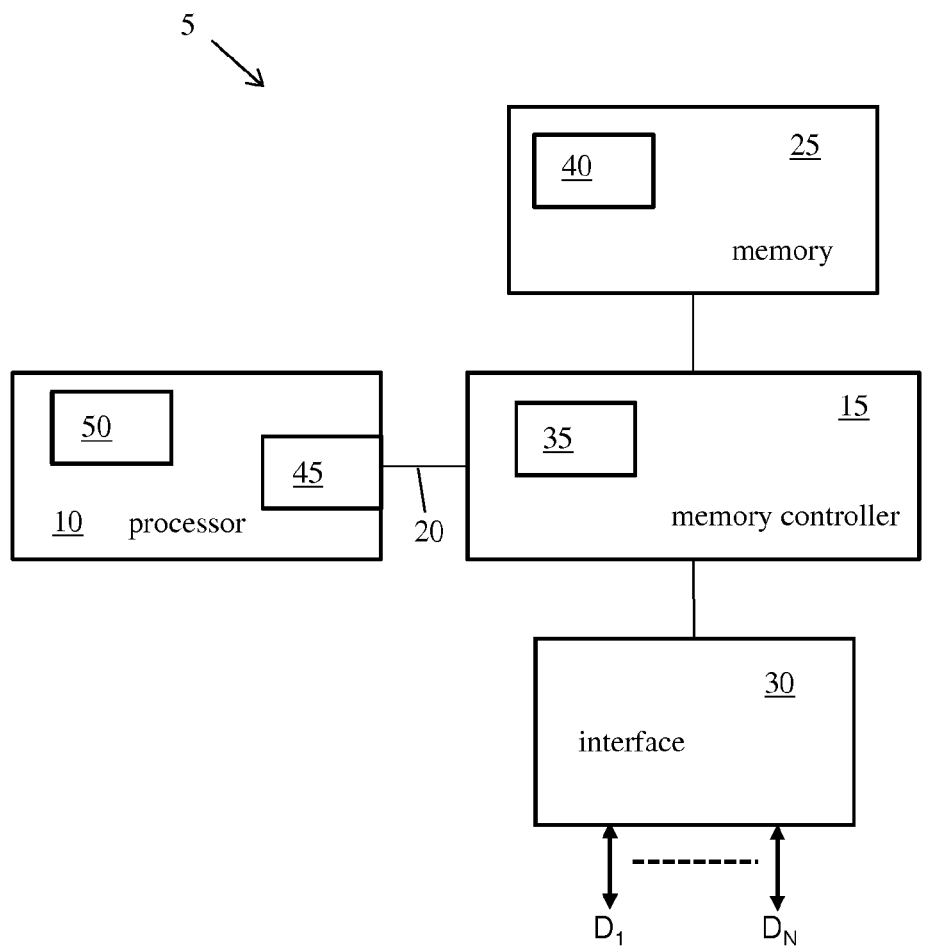
FIG. 1 is an illustrative diagram of a data processing system in accordance with aspects of the invention.

The invention relates to systems and methods for data processing and, more particularly, to systems and methods for efficient data transfer in a data processing system that includes saving and restoring residual content of a write gather pipe. More specifically, implementations of the present invention provide systems and methods for saving and restoring the state of the WPB. In embodiments, at least one new architected register (e.g., a Write Pipe Save Address Register (WPSAR)) and at least one new finite state machine (e.g., a Save Restore (SR) Finite State Machine (FSM)) may be implemented in a write gather pipe in order to provide the WPB with functionality for saving and restoring any residual data content of the WPB (e.g., residual WPB content).

For example in accordance with aspects of the present invention, upon an interruption of a processing thread that includes the gathering of data content within the write gather pipe, an address value may be written to the WPSAR, which triggers the SR FSM to initiate a save operation of any residual WPB content within the write gather pipe. More specifically, the SR FSM waits for any pending activity in the WPB to be completed, then pushes any residual WPB content out of the WPB, in a single burst (e.g., a 32 byte) operation, to the address value specified in the WPSAR. In embodiments, a restore operation may be implemented to take the burst (e.g., 32 byte) output of the save operation, and perform an appropriate sequence of cache-inhibited store instructions to restore the residual WPB content to its pre-interrupt state. Advantageously, this approach takes advantage of the existing logic used for conventional write gathering.

As will be appreciated by one skilled in the art, the following description of embodiments and aspects of the present invention pertain to systems and methods for efficient data transfer in a data processing system that includes saving and restoring residual content of a write gather pipe. However, it should be understood by one skilled in the art that the write gather pipe of the present invention may encompass a variety of data processing structures implemented for store gathering, such as write-gather or store-gather facilities, without departing from the scope and spirit of the described embodiments.

Data Processing System Diagram

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference to FIG. 1, there is depicted a block diagram of an exemplary embodiment of a data processing system 5 in accordance with the present invention. Data processing system 5 may comprise either of a general purpose data processing system, such as a desktop or workstation computer system, or a special purpose data processing system, such as an electronic gaming system, personal digital assistant (PDA), mobile telephone, etc.

As shown, data processing system 5 may include a processor 10 and a memory controller 15 that are each coupled to an interconnect 20. Interconnect 20 may be a conventional bus including data, address and control lines, a switch fabric, or any other type of interconnect. Memory controller 15 may be coupled to a memory 25 that provides volatile and/or non-volatile data storage and an input/output (I/O) interface 30 that provides connections for a number of I/O devices $D_1$-$D_N$. As should be understood, depending upon its intended application, data processing system 5 may include any number of other useful or necessary components that are not relevant to an understanding of the present invention and are accordingly omitted from FIG. 1.

In operation, processor 10 issues read requests on interconnect 20 to obtain data (including instructions) from memory controller 15 and issues write requests on interconnect 20 to supply data to memory controller 15. Each of these read and write requests typically includes at least one address. In order to service such read and write requests, memory controller 15 may maintain a memory map 35 that records the allocation (e.g., by operating system (OS) 40) of certain addresses to storage locations in memory 25 and other addresses to the various I/O devices $D_1$-$D_N$ interfaced by I/O interface 30. Memory controller 15 thus utilizes memory map 35 to read data from or write data to the appropriate storage location in memory 25 or the appropriate I/O device $D_1$-$D_N$ for an address specified by processor 10.

In accordance with some aspects of the present invention, at least some write requests by processor 10 may be order-sensitive, meaning that for proper operation of data processing system 5, the storage location in memory 25 or I/O device specified by the address in such order-sensitive write requests must receive data from memory controller 15 in the order determined by processor 10. Memory controller 15 therefore services at least some, and preferably all, write requests in an order-sensitive manner.

As illustrated in FIG. 1, the processor 10 may be coupled, via a bus interface unit (BIU) 45, to interconnect 20, which in embodiments may include address, data, and control buses. BIU 45 manages the transfer of information between processor 10 and other devices coupled to interconnect 20, such as memory controller 15. In accordance with the present invention and as described in detail below with respect to FIGS. 2 and 3, outgoing data may advantageously be accumulated by a write gather pipe 50 in order to maximize the utilization of the bandwidth of the data bus while supporting order-sensitive data transfer.

Write Gather Pipe Diagram

Figure 2:
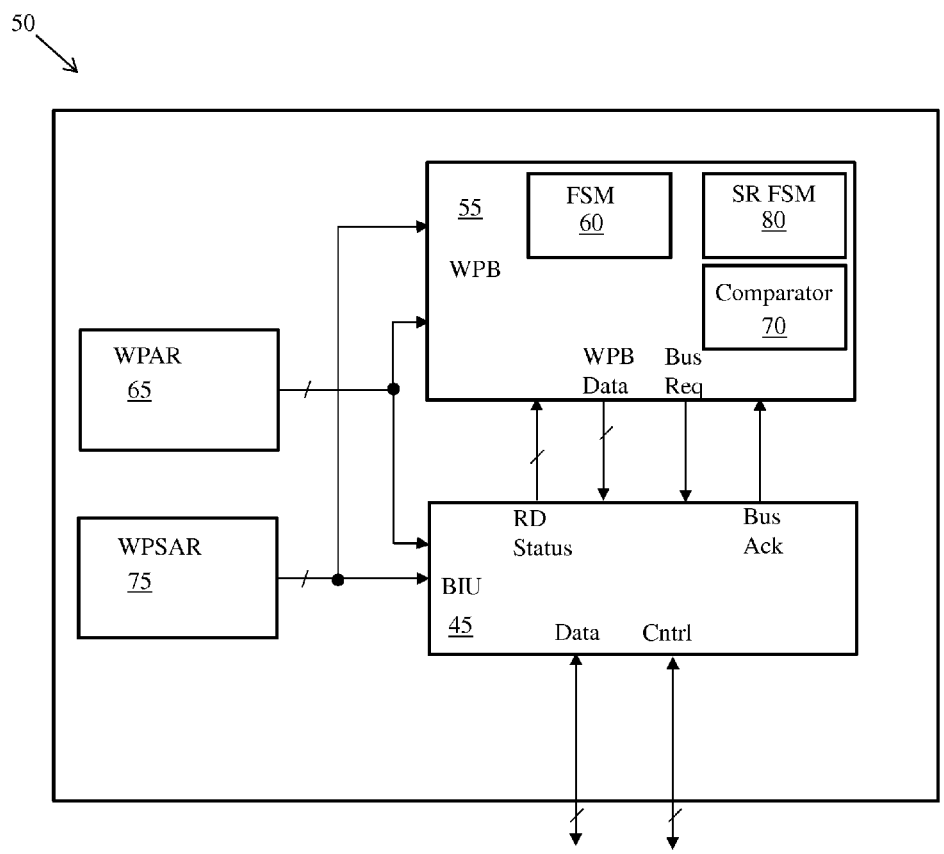
FIG. 2 is an illustrative diagram of a write gather pipe in accordance with aspects of the invention.

FIG. 2 shows a block diagram of embodiments of write gather pipe 50 of FIG. 1 together with associated circuitry. As illustrated, write gather pipe 50 includes a circular FIFO buffer 55 (e.g., a 128-byte circular FIFO buffer (WPB)) providing order-sensitive storage for a plurality of data bytes. For example, in embodiments, the WPB 55 may have a capacity of 128 bytes, a maximum fill rate of 8 bytes per cycle, a minimum data granule input size of 1 byte, and a drain rate of at least two bytes (and preferably 8 bytes) per cycle. Associated with the WPB 55 is a WPB finite state machine 60 (FSM) and an address register 65 (e.g., a special purpose register, the Write Pipe Address Register (WPAR)). The WPAR 65 is preferably software readable and writable. In embodiments, WPAR 65 may hold a single (e.g., 32-bit) address that is associated with all data in the WPB 55.

Many physical implementations of write gather pipe 50 are possible. For example, loading data into WPB 55 and transferring data out of WPB 55 may be managed utilizing "head" and "tail" pointers, as is known in the art, or some other queue management technique. In addition, WPAR 65 need not be physically located within write gather pipe 50, but could also be implemented as a special-purpose register located elsewhere in processor 10 or as a general purpose register within a general purpose register file that is associated with WPB 55 by an instruction.

A comparator 70 is coupled to both the WPAR 65 and the WPB 55. Comparator 70 determines whether to accumulate output data in WPB 55 by comparing the address associated with the output data with the contents of the WPAR 65. If the addresses match, the data are appended to the "tail" of the data bytes already residing in WPB 55, if any. If WPB 55 is full, the store operation is preferably held off until room becomes available in WPB 55 through a data transfer. Alternatively, if comparator 70 determines that the addresses do not match, WPB 55 is bypassed, and the address and data may be output onto the address bus and the data bus, respectively, as soon as BIU 45 obtains ownership of interconnect 20.

A software programmable register, WPSAR 75, is configured to specify a target address at which any residual WPB content may be saved upon interruption to the accumulation of data in the WPB 55. In addition, writing the target address to the WPSAR causes the SR FSM 80 to initiate a save operation of the residual WPB content. More specifically, the SR FSM 80 may be configured to initiate and control a sequence of process steps used to save the residual WPB content, which is described in further detail below with respect to FIG. 3. In embodiments, the BIU 45 may be implemented within the write gather pipe 50 in order to manage the transfer of information between the WPB 55, WPB FSM 60, WPAR 65, comparator 70, WPSAR 75, SR FSM 80, and other devices coupled to interconnect 20, such as memory controller 15.

Flow Diagram

Figure 3:
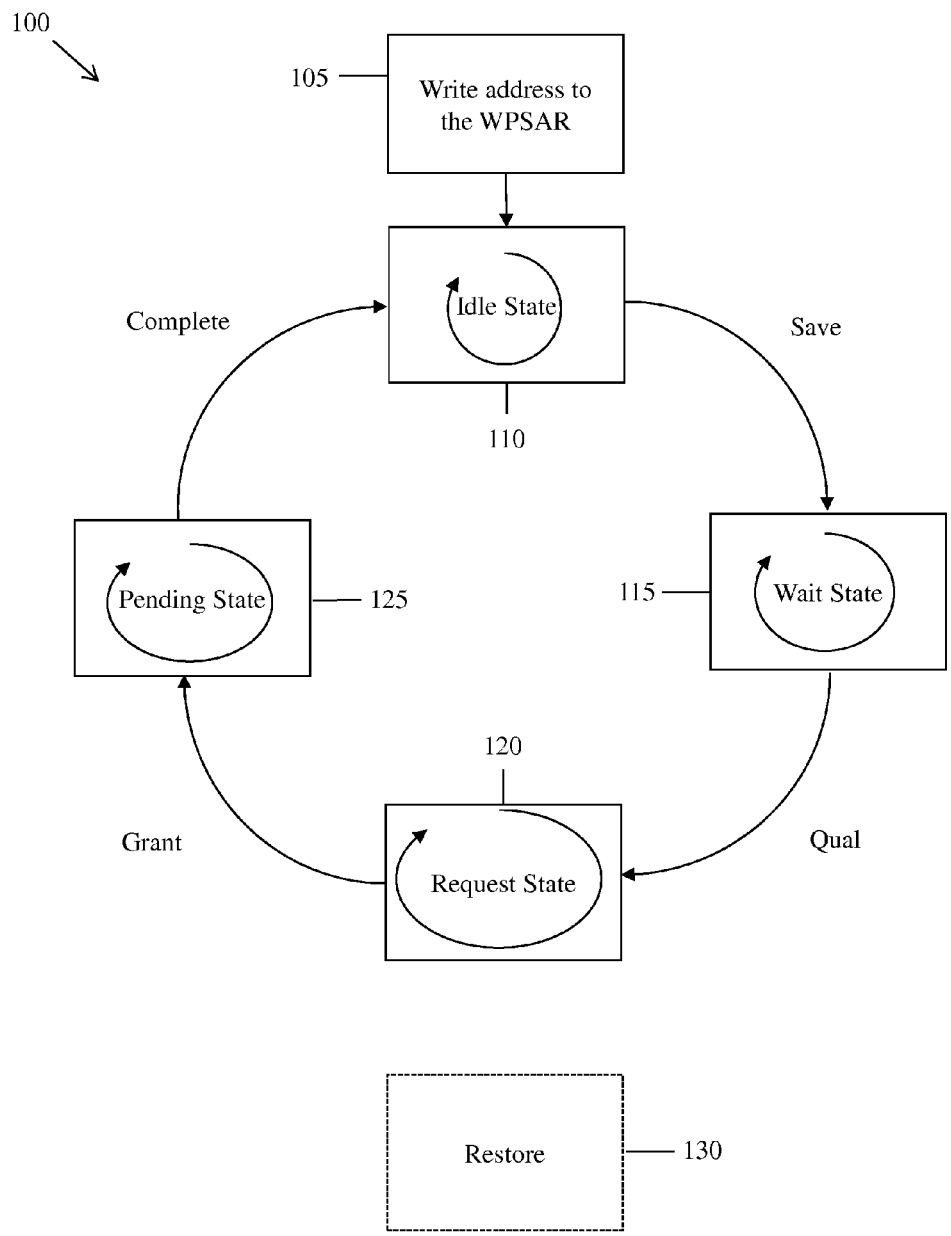
FIG. 3 is an illustrative process flow for implementing the systems in accordance with aspects of the invention.

FIG. 3 shows an exemplary flow for performing aspects of the present invention. The steps of FIG. 3 may be implemented using the systems of FIGS. 1 and 2, for example.

The flowcharts and/or block diagrams in FIG. 3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 3, there is illustrated an exemplary embodiment of a process 100 of transferring and saving data in a data processing system utilizing a write gather pipe in accordance with the present invention. For example, whenever at least a predetermined number of bytes (e.g., 32 bytes) are in the WPB, the write gather pipe or write gather facility may automatically make a bus request to write the next cache line of data to memory, using a burst transaction (e.g., a write-with-flush burst transaction). However, at any given time, there may be zero bytes to any number of bytes less than the predetermined number of bytes (e.g., 31 bytes) that cannot yet be written to memory (i.e., the predetermined number of bytes has not been achieved to trigger the burst transaction). When a thread that is using the write gather pipe is interrupted, the residual WPB content (i.e., one byte to any number of bytes less than the predetermined number of bytes) can be saved in accordance with aspects of the present invention.

More specifically, the process 100 begins at step 105, where an address is written to the WPSAR. In embodiments, an interrupt handler may determine that a thread that is using the write gather pipe has been interrupted and the interrupt handler may write an address to the WPSAR in order to trigger a save operation for any residual WPB content within the write gather pipe. For example, a thread may be storing, as bytes, the integers 1 through 50 to a WPAR address. These 50 bytes are gathered in the WPB, and after the first 32 bytes are gathered, the 32 bytes are automatically written with a burst transaction (e.g., a write-with-flush burst transaction) to the WPAR address in a memory. However, if the thread is interrupted at this point, 18 (x'12') residual bytes are in the WPB (i.e., 50 bytes gathered−32 bytes written=18 residual bytes).

The interrupt handler can trigger a save of the WPB residual content in the memory by writing an address to the WPSAR.

At step 110, a save signal may be received by the FSM to trigger a save process of any residual WPB content within the write gather pipe. In embodiments, the save signal may be sent from the WPSAR to the FSM upon the WPSAR receiving the address from the interrupt handler. For example, the FSM may be in an idle state and continuously checking for the save signal from the WPSAR that is indicative of residual WPB content that should be saved to the memory. Thereafter, the FSM transitions to a wait state.

At step 115, the FSM checks the WPB for activity. In embodiments, the FSM checks and waits for any pending WPB activity (e.g., WPB operations or transfers with respect to a thread) to be completed before initiating the data transfer of the residual WPB content. If activity in the WPB is pending, then a qualified save of the residual WPB content may not be substantiated. The FSM remains in the wait state until the pending WPB activity is completed.

In embodiments, once there is no outstanding WPB activity, a qualified signal may be received by the FSM. The qualified signal may cause the FSM to request the BIU for a data transfer of the residual WPB content to the WPSAR address in the memory. Thereafter, the FSM transitions to a request state (e.g., a bus request state).

At step 120, a grant signal may be received by the FSM that the BIU has granted the request for the data transfer of the residual WPB content. In embodiments, once the residual WPB content is about to be transferred, the signal may cause the FSM to tack on or stuff a byte count of the residual WPB content into a last byte of the residual WPB byte data block. The byte count may include a size field that indicates a byte size of the residual WPB content.

Thereafter, the residual WPB content is transferred and saved at the WPSAR address in the memory. For example, the residual WPB content or cached line saved at the WPSAR address may include for example {0x21222324245262728}, {0x292a2b2c2d2e2f30}, {0x3132000000000000}, and {0x0000000000000012}, corresponding to the 50 byte example described previously. The bytes shown for clarity as x '00' are undefined, but it should be understood to those of skill in the art that they may be any value. Thereafter, the FSM transitions to a pending state.

At step 125, a complete signal may be received by the FSM once the data transfer of the residual WPB content is completed. In embodiments, once the residual WPB content is transferred, the complete signal may reset the WPB to clear out any additional logic (e.g., control logic such as pointers in the write gather pipe) and place the WPB in an empty state. Thereafter, the FSM transitions back to the idle state.

At step 130, once the residual WPB content is transferred and saved at the WPSAR address and the WPB is reset a restore operation may be performed at a later time in order to restore the residual WPB content and place the WPB back to its pre-interrupt state. In embodiments, the restore operation may be performed by software, which takes the residual WPB content of the save operation, and performs an appropriate sequence of cache-inhibited store instructions to restore the WPB to its pre-interrupt state.

The processes discussed with respect to FIG. 3 may be implemented in an exemplary embodiment combining software and hardware aspects. For example, when a thread that is using the write gather pipe is interrupted, the residual WPB content can be saved in accordance with aspects of the present invention. A move to special purpose register operation (rasp) may be used to trigger a bus request from the write gather pipe to store the residual WPB content to a physical address written in the WPSAR. In embodiments, the write gather pipe may be disabled when no store data is gathered within the write gather pipe, and a write to the WPSAR may not trigger the cache line store.

Since the cache line write of the residual WPB content bypasses the caches, software may be used for ensuring coherency with respect to the save operation. For example, to eliminate any cached copies of the cache line, software may execute a data cache block invalidate operation (dcbi) to the same address before executing the mtspr to the WPSAR. After the WPSAR has been written, software can check the status of the write gather pipe to determine that all valid data has been written to memory. This process may be accomplished by a synchronization operation (sync) followed by a read of the WPAR[BNE] field. The sync operation may ensure that the WPSAR write has completed before reading WPAR[BNE]. The BNE bit may read as "1" until the partial line has been written to memory. Otherwise, the BNE bit may be asserted only when there at least the predetermined number of bytes (e.g., 32 bytes) is in the WPB, indicating that at least one cache line write to memory is outstanding.

A code sequence to save the residual WP content to the memory, if a general purpose register (4) holds the stack pointer, may include:

Save:
  addi r3, r4, 32; increment the stack pointer by one cache line
  andi r3, r3, 0xFFE0; cache line align the address
  dcbi r0, r3; invalidate target line in caches
  sync; ensure previous writes to WP have completed
  mtspr WPSAR, r3; save WP context
  addi r4, r4, 64; update stack pointer In embodiments, to properly restore the WPB when the process is reversed, two full cache lines may be allocated to the residual WPB content. In addition to the BNE bit, the WPAR may have a second status bit, e.g., a buffer residue (BR) that indicates that residual bytes are in the WPB. This bit may be used to determine whether there is a need to save the WPB content. As is the case with checking the BNE bit, a sync operation may be used before reading the WPAR[BR] bit to ensure that the previous WPSAR write has completed. The BR bit may be asserted anytime the number of bytes currently in the WPB is not a multiple of the predetermined number of bytes (e.g., 32 bytes).

In embodiments, the restore of the residual WPB content at a later time may comprise reading back the cache line from the memory, extracting the number of valid bytes from the last byte in the cache line, and then writing that number of bytes back into the WPB. Continuing the above example, and assuming a general purpose register (5) contains the desired WPSAR address, the following code sequence may be implemented to restore the previously saved residual WP content to the WPB:

Restore:
  mtspr WPAR, r5; reset the WP facility
  addi r3, r4, −32; decrement stack pointer by one cache line
  andi r3, r3, 0xFFE0; starting address of cache line is cache line aligned
  lbz r6, 0x1F(r3); byte count is last byte of cache line
  cmpi cr2, 0, r6, 0; test for count of zero
  beq cr2, done
  mtspr CTR, r6; put byte count in CTR
  addi r3, r3, −1
loop:
  lbzu r6, r3; load next byte of cache line
  stb r5, r6; store next byte in WPB
  bc 18, 0, loop; loop until CTR is zero done:
addi r4, r4, −64; update stack pointer As will be appreciated by one skilled in the art, these software aspects of the present invention may be embodied as a system, method or computer program product. Accordingly, it should be understood that the software may be implemented as a computing system which is hardwired to perform the instructions of the software. In this scenario, the processor, for example, may provide the steps of the invention.

The systems and methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data processing comprising:
   writing an address to a register; and
   initiating a save operation of residual data by a finite state machine within a write gather facility,
   wherein the writing of the address to the register causes the finite state machine to initiate the save operation; and
   the residual data is one byte to any number of bytes less than a predetermined number of bytes gathered in the write gather facility.

2. The method of claim 1, wherein the address is written into the register upon interruption of a thread that is gathering data in the write gather facility, and the predetermined number of bytes is a number that causes the write gather facility to initiate a burst transaction to write the predetermined number of bytes in a memory.

3. The method of claim 1, wherein the initiating the save operation comprises receiving a save signal at the finite state machine.

4. A method for data processing comprising:
   writing an address to a register; and
   initiating a save operation of residual data within a write gather facility,
wherein the writing of the address to the register causes the initiating of the save operation;
   the residual data is one byte to any number of bytes less than a predetermined number of bytes gathered in the write gather facility, and
   the initiating the save operation comprises receiving a save signal at a finite state machine,
   and further comprising checking a buffer of the write gathering facility for activity, and when there is activity pending in the buffer, waiting for the pending activity to be completed prior to performing the save operation.

5. The method of claim 4, further comprising when there is no activity pending in the buffer, requesting a data transfer of the residual data to a memory.

6. The method of claim 5, further comprising receiving a grant signal once a data transfer of the residual data to the memory has been granted, and tacking a byte count of the residual data into a last byte of a residual data block.

7. The method of claim 6, wherein the byte count includes a size field that indicates a byte size of the residual data.

8. The method of claim 7, further comprising transferring the residual data including the byte count to the memory at the address written to the register.

9. The method of claim 8, further comprising clearing remaining data from within the write gather facility.

10. The method of claim 9, further comprising restoring the residual data from the memory to the write gather facility.

11. A method for data processing comprising:
    writing an address to a register upon interruption of a thread that is gathering data in a write gather facility;
    initiating a save operation of residual data by a finite state machine within the write gather facility, wherein the residual data is one byte to any number of bytes less than a predetermined number of bytes gathered in the write gather facility; and
    transferring the residual data including the byte count to a memory at the address written to the register,
    wherein the writing of the address to the register causes finite state machine to initiate the save operation and the transfer of the residual data.

12. The method of claim 11, wherein the predetermined number of bytes is a number that causes the write gather facility to initiate a burst transaction to write the predetermined number of bytes in a memory.

13. A method for data processing comprising:
    writing an address to a register upon interruption of a thread that is gathering data in a write gather facility;
    initiating a save operation of residual data within the write gather facility, wherein the residual data is one byte to any number of bytes less than a predetermined number of bytes gathered in the write gather facility; and
    transferring the residual data including the byte count to a memory at the address written to the register,
    wherein the writing of the address to the register causes the initiating the save operation and the transfer, and
    wherein the predetermined number of bytes is a number that causes the write gather facility to initiate a burst transaction to write the predetermined number of bytes in a memory,
    and further comprising tacking a byte count of the residual data into a last byte of a residual data block prior to the transferring the residual data.

14. The method of claim 13, wherein the byte count includes a size field that indicates a byte size of the residual data.

15. The method of claim 11, further comprising restoring the residual data from the memory to the write gather facility.

16. A computing system comprising:
    at least one register configured to allow a save address to be specified;
    a processor configured to write the save address to the register;
    a write gather facility configured to gather data and initiate a burst transaction to write the data in a memory; and at least one finite state machine configured to initiate a save operation of residual data within the write gather facility, wherein the writing of the save address to the at least one register triggers the at least one finite state machine to initiate the save operation, and the residual data is one byte to any number of bytes less than a predetermined number of bytes gathered in the write gather facility, which causes the write gather facility to initiate the burst transaction to write the data in the memory.

17. The computing system of claim 16, wherein the save operation comprises a data transfer of the residual data to the memory.

18. The computing system of claim 17, further comprising a buffer, wherein the at least one finite state machine is further configured to check the buffer for activity prior to transferring the residual data to the memory.

19. The computing system of claim 18, wherein the at least one finite state machine is further configured to tack a byte count of the residual data into a last byte of a residual data block.

20. The computing system of claim 19, wherein the byte count includes a size field that indicates a byte size of the residual data.

* * * * *